March 17, 1970  T. R. SPRUNGER ET AL  3,501,635
PORTABLE THERMOGRAPHIC COPYING MACHINE WITH PHOTOELECTRIC
MEANS TO ACTIVATE THE HEAT LAMP THEREOF UPON INSERTION
OF A SPECIMEN INTO THE MACHINE Filed May 1, 1968  7 Sheets-Sheet 1

INVENTORS
THOMAS R. SPRUNGER
STEFAN J. KRAKOWIAK
BY Newton, Hopkins,
& Ormsby
Attorneys INVENTORS
THOMAS R. SPRUNGER
STEFAN J. KRAKOWIAK
BY Newton, Hopkins,
& Ormsby
Attorneys INVENTORS
THOMAS R. SPRUNGER
STEFAN J. KRAKOWIAK
BY Newton, Hopkins,
& Ormsby
Attorneys March 17, 1970

T. R. SPRUNGER ET AL 3,501,635

PORTABLE THERMOGRAPHIC COPYING MACHINE WITH PHOTOELECTRIC
MEANS TO ACTIVATE THE HEAT LAMP THEREOF UPON INSERTION
OF A SPECIMEN INTO THE MACHINE

Filed May 1, 1968

INVENTORS
THOMAS R. SPRUNGER
STEFAN J. KRAKOWIAK
BY Newton, Hopkins,
& Ormsby
Attorneys

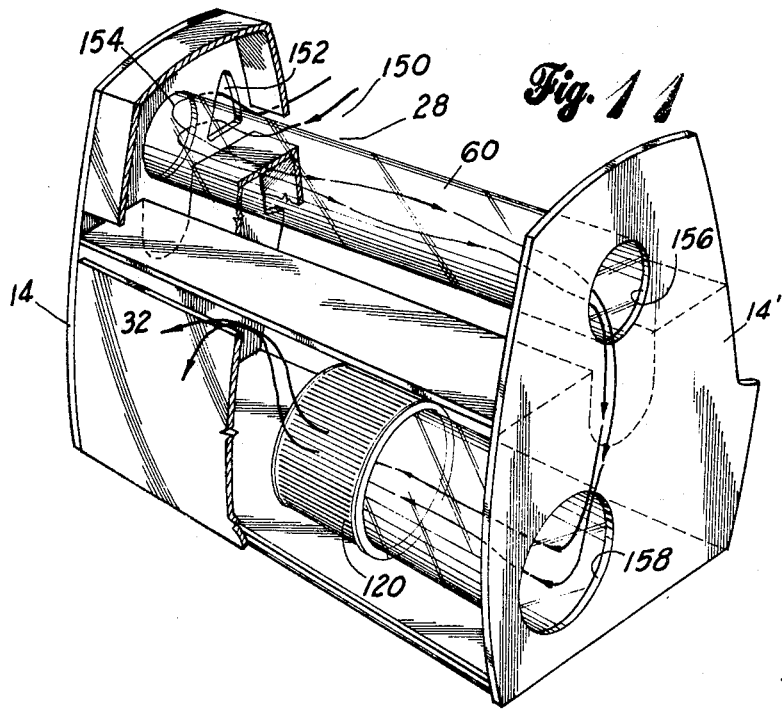
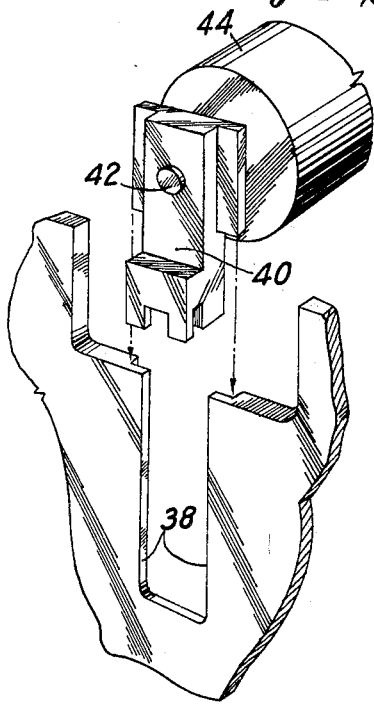
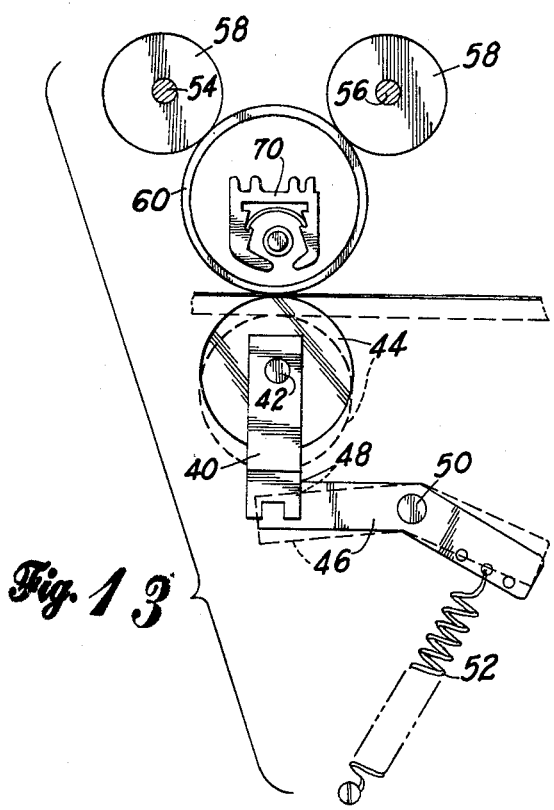

`United States Patent Office`

3,501,635
Patented Mar. 17, 1970

3,501,635
PORTABLE THERMOGRAPHIC COPYING MACHINE WITH PHOTOELECTRIC MEANS TO ACTIVATE THE HEAT LAMP THEREOF UPON INSERTION OF A SPECIMEN INTO THE MACHINE
Thomas R. Sprunger and Stefan J. Krakowiak, Atlanta, Ga., assignors to Scripto, Inc., Atlanta, Ga., a corporation of Georgia
Filed May 1, 1968, Ser. No. 725,774
Int. Cl. B41m 7/00
U.S. Cl. 250—65         10 Claims

ABSTRACT OF THE DISCLOSURE

The present invention relates to a portable thermographic copying machine that is adapted to permit the passage of specimens and copy material of varying thicknesses and incorporates an arrangement for feeding the specimen and copy material through the machine in substantially a linear path for attaining clear reproductions by preventing relative displacement therebetween.

Also, the present copying machine embodies a reflector arrangement that utilizes a C-shaped frame member and a gold plated reflector plate disposed therein so as to have an air void formed therebetween for attaining uniform distribution of heat across the reflector plate from a heat source disposed within the reflector.

Furthermore, there is provided a light sensing means for activating the heat source upon introduction of the specimen and copy material within the machine and a cooling system to effect unidirectional flow of air through the machine for cooling that is operated by the same means used for driving the unit.

BACKGROUND OF THE INVENTION

Field of the invention

The present invention relates to a portable thermographic copying machine for reproducing a copy of a selected specimen.

Description of the prior art

Prior art embodiments have disclosed thermographic copying machines which produce a copy by one of two general approaches. First, the use of a heat sensitive paper that is associated with the specimen to be copied. Second, the use of a heat sensitive carbon associated with the specimen to be copied, both of which are further associated with the sheet of material that will form the resulting copy.

The method that utilizes heat sensitive carbons may be further subdivided into two further categories (1) that employs a heat sensitive carbon of a high melting point and (2) a heat sensitive carbon of a low melting point sometimes referred to as a wet or fluid carbon. The heat sensitive carbon paper of a high melting point is employed with plain paper to obtain a normal copy.

Furthermore, this heat sensitive carbon type paper of a high melting point may be employed with a transparent acetate sheet to form a transparency which can be utilized for visual projection.

Heat sensitive carbon paper utilizing a carbon of a low melting temperature is used with normal paper to produce that which is referred to in the trade as a "spirit master" or is utilized with a specially treated paper having a heat sensitive coating to produce a "mimeograph master."

In addition, machines of this type can be used to laminate documents wherein a plastic sheet which is coated on one side with a heat activated adhering material is disposed about the document and adhered thereto by heat sealing.

A variation of the laminated procedure can be utilized to produce a color liftoff by laminating the exposed surface of a document and then soaking both the document and the laminated sheet in hot water to cause separation, whereupon the color appearing on the document is lifted off by the adhering surface of the plastic material, thereby producing a color liftoff that likewise can be utilized for visual projection.

The present copying machine affords a unit that has been engineered for simplicity and economy that can carry out the above methods used in the prior art by the use of one single piece of equipment.

SUMMARY OF THE INVENTION

The present disclosure relates to a thermographic copying machine for reproducing a copy of a selected specimen. The machine includes a housing having an entry throat formed in the front thereof and an exit throat formed in its rear. The exit and entry throats are disposed in a substantially common plane so that material fed through the machine follows a substantially linear path, thereby preventing relative displacement between the specimen and the copy material whereby a clear reproduction is obtained.

The machine is equipped to permit the passage of specimens and copy material of varying thicknesses since its feed rollers are adapted for relative displacement. Furthermore, the present copying machine is equipped with an improved reflector that utilizes an arrangement of a C-shaped frame member having its opening angularly displaced toward the entry throat and which carries a reflector gold-plated on one side only, the reflector being further provided with an air void disposed between the reflector plate and the interior of the C-shaped frame member so as to attain uniform distribution of heat across the reflector plate for achieving uniform reproduction along its opening. In addition, a light sensing means is provided for activating a heat lamp which is disposed within the reflector. An electronic variable speed drive means is incorporated to vary the rate of feeding and hence the intensity of the copy, and a cooling means is also provided which is associated with the single drive means used for feeding copy through the machine.

BRIEF DESCRIPTION OF THE DRAWINGS

These and other advantages and features of the present invention will be more clearly understood from the following detailed description and accompanying drawings in which like characters of reference designate corresponding parts throughout and in which:

FIG. 11 is a perspective view with certain parts being broken away illustrating the air flow path which is utilized to cool the machine during use;

FIG. 12 is a partial perspective view showing the block and slot arrangement utilized for allowing displacement between the drive roller and the transparent roller for allowing passage of specimens of varying thicknesses; and FIG. 13 is a schematic view showing the arrangement of the reflector, drive gear, and the transparent roller combination.

DESCRIPTION OF ILLUSTRATIVE EMBODIMENT

These figures and the following detailed description disclose an apparatus which embodies the invention disclosed herein; however, it should be understood that the invention is not limited to the particular form of the embodiment disclosed, since it may be embodied in other equivalent forms.

Figure 1:
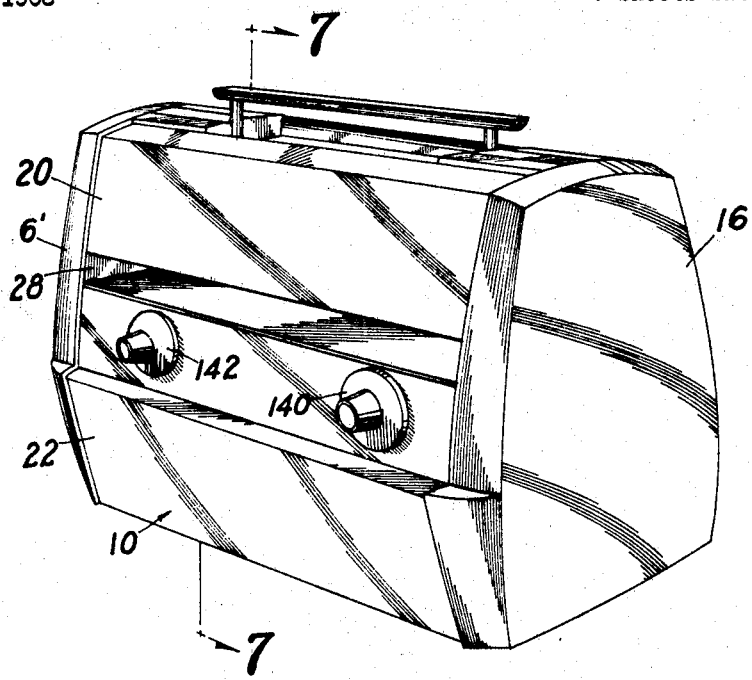
FIG. 1 is an overall perspective view of the portable thermographic copying machine of the present invention.
Figure 4:
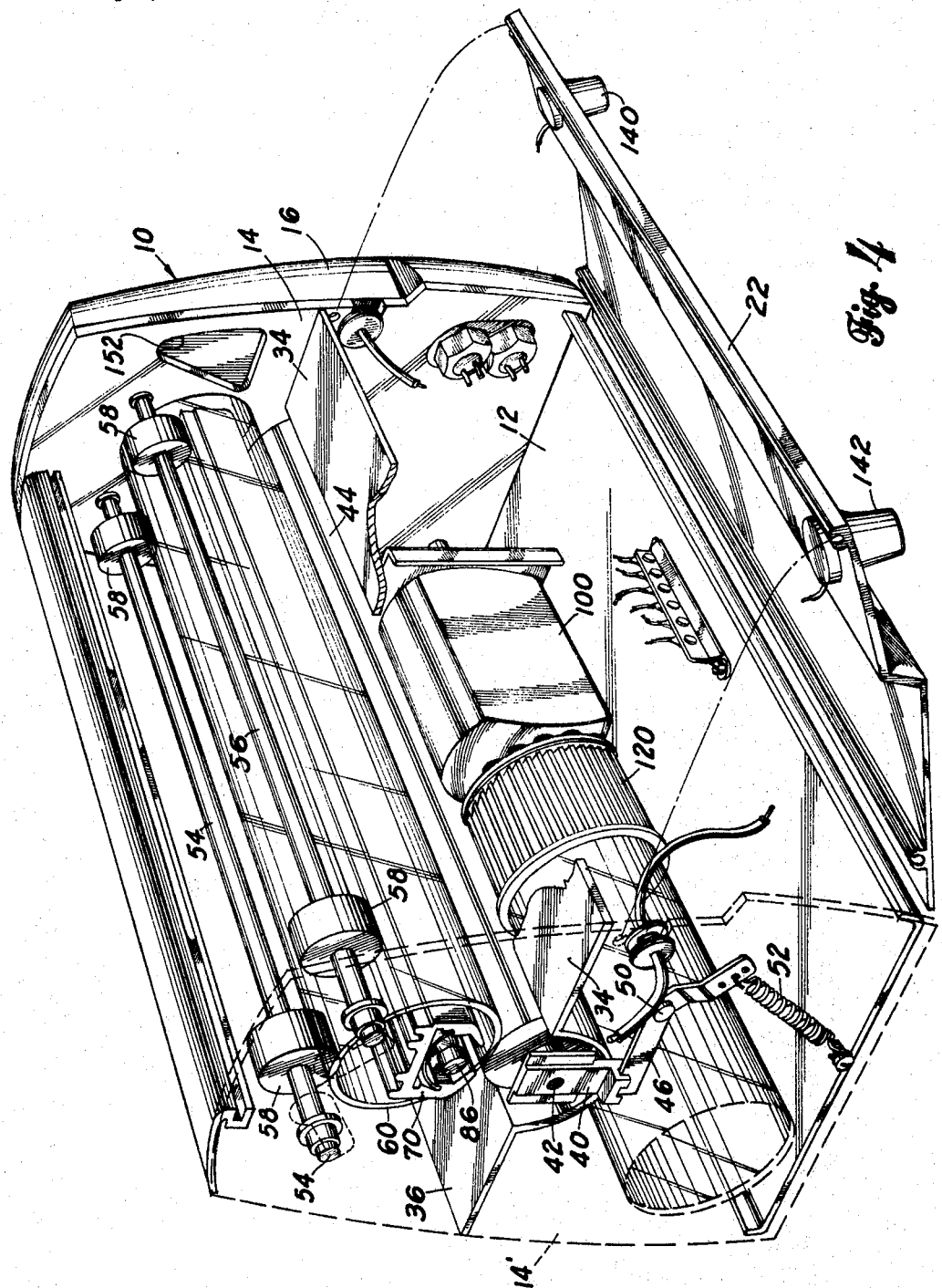
FIG. 4 is a front perspective view with the upper and lower front panels and the left end panel removed and with certain parts being partially broken away for ease of illustration.
Figure 7:
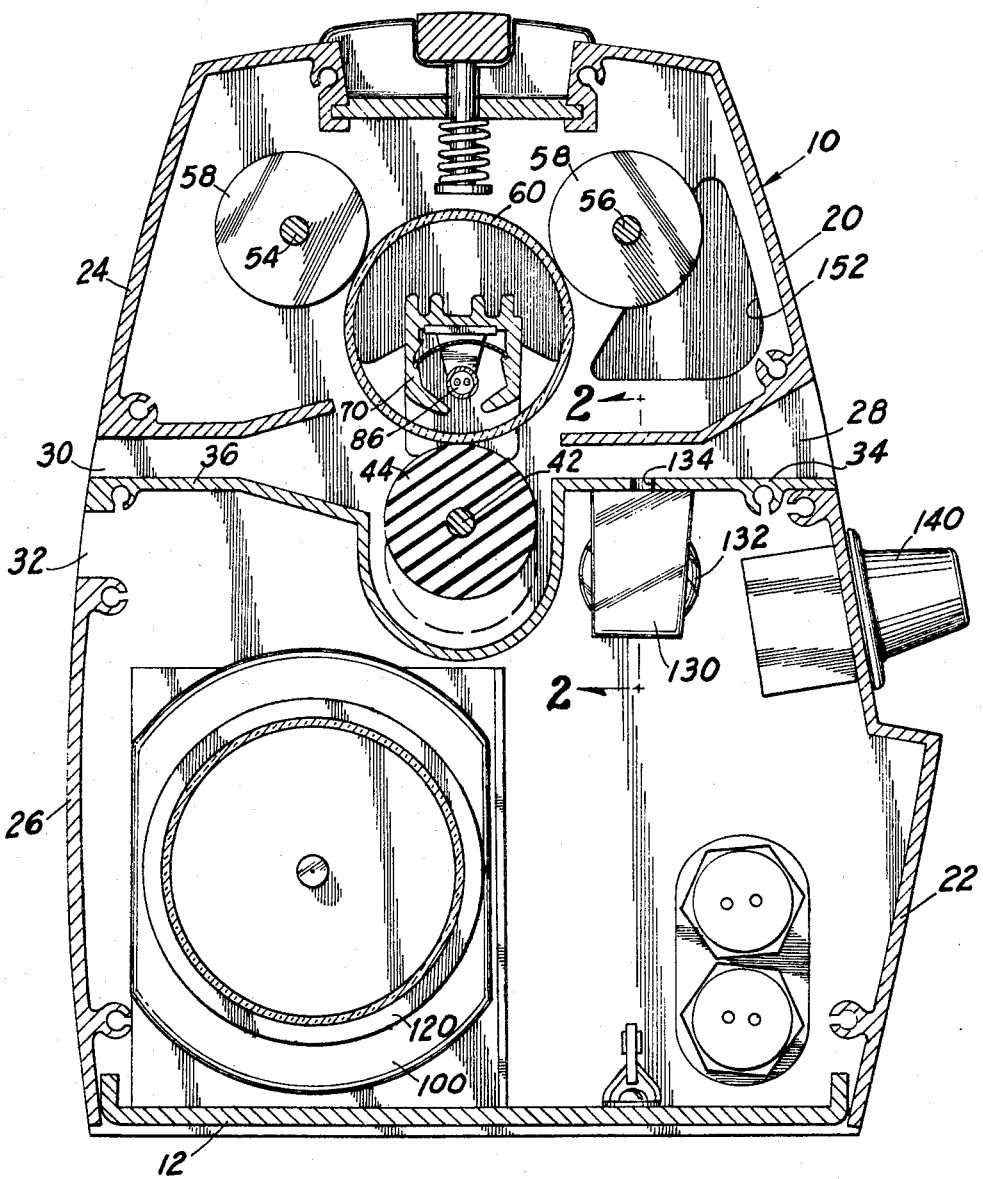
FIG. 7 is a vertical cross-sectional view taken along the lines 7—7 in FIG. 1.

Referring generally to FIGURES 1, 4, and 7, the copying machine herein is generally referred to by the numeral 10 and as shown in FIG. 4 includes a base 12 to which a pair of vertically upstanding side plates 14 and 14′ are affixed. Outwardly of said side plates 14 and 14′ are disposed end panels 16 and 16′. Referring now to FIG. 7, it is shown that between side plates 14 and 14′ and end panels 16 and 16′ are positioned an upper front panel 20 and a lower front panel 22 as well as an upper rear panel 24 and a lower rear panel 26. Between the upper front panel 20 and the lower front panel 22 there is formed an entry throat 28 and likewise between the upper rear panel 24 and the lower rear panel 26 there is disposed an exit throat 30. Furthermore, an exhaust slot 32 is disposed adjacent and beneath the exit throat 30.

Positioned between said side plates 14 and 14′ are horizontally extending entry support plate 34 and exit support plate 36 that form the lower extremity of said entry throat 28 and exit throat 30 respectively.

Within each side plate 14 there is formed a vertically extending slot 38 in which a slide bar 40 is disposed that carries thereon bushings 42, the details of which are shown in FIG. 12. Within bushings 42 there is rotatably mounted a rubber roller 44 which is urged upwardly within said slot by virtue of arm 46 contacting the shoulder 48 disposed at the lower extremity of the slide bar 40, said arm 46 being pivoted about pivot point 50 under the action of the biasing spring means 52.

Between the upper portions of the side plates 14 and 14′ a pair of shafts 54 and 56 are positioned in spaced relation. Each shaft carries thereon a pair of rubber rollers 58 disposed adjacent each end thereof.

Positioned between the rubber rollers 58 and the rubber drive roller 44 is a transparent glass cylinder 60. On the outer sides of the side plates 14 and 14′ are positioned depending brackets 62, the lower end of each bracket carrying lamp sockets 64, and intermediate the extremities of each bracket an inwardly directed ear 66 is fitted into the reflector 70 which is positioned within the transparent roller 60.

Figure 10:
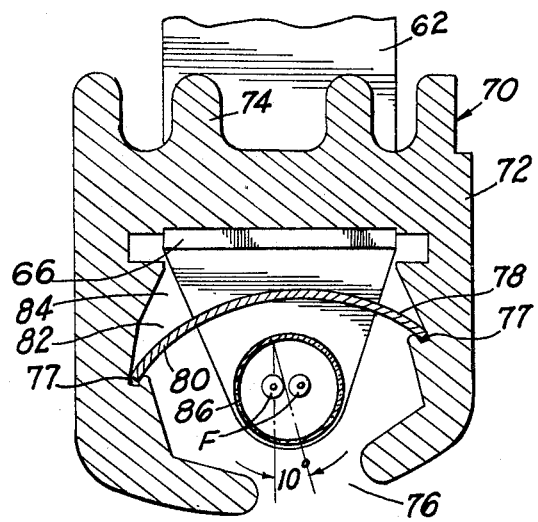
FIG. 10 is an end elevational view of the improved reflector utilized in the present copy machine.

Now referring to FIG. 10, the reflector 70 is a generally C-shaped member 72 having longitudinally extending outwardly directed, spaced heat dissipating fins 74 disposed on its upper outer side. The center C of the opening 76 of the C-shaped member 72 is angularly displaced from the vertical toward the entry throat 28 by an angle of approximately 10°. Within the interior of the C-shaped member 72 there are formed grooves 77 for carrying a reflector plate 78. It should be noted that the concave side 80 of the reflector plate 78 faces the opening 76 of said C-shaped member 72 and that between the convex side 82 of the reflector plate 78 and the interior of the C-shaped member 72 there is formed an air void 84. The reflector plate 78 is first nickel plated and the concave side 80 is further plated with 22 carat gold. Along the focal point F of the semi-circular shaped reflector plate 78 there is disposed a heat lamp 86, the ends of which are carried by the light sockets 64. The heat lamp 86 is a tubular infrared lamp that operates at 115 volts, 1350 watts, 2700°/K.min. and is available from General Electric Co. The heat lamp 86 is properly maintained by the sockets 64.

Figure 2:
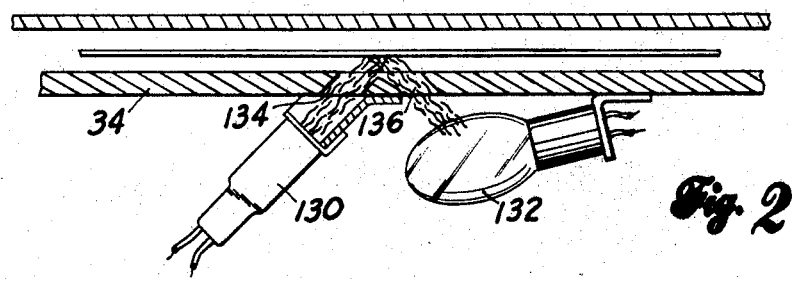
FIG. 2 is a partial cross-sectional view taken along the line 2—2 in FIG. 7 showing the light sensing means that is utilized for activating the heat lamp to provide the desired copy of the specimen.
Figure 5:
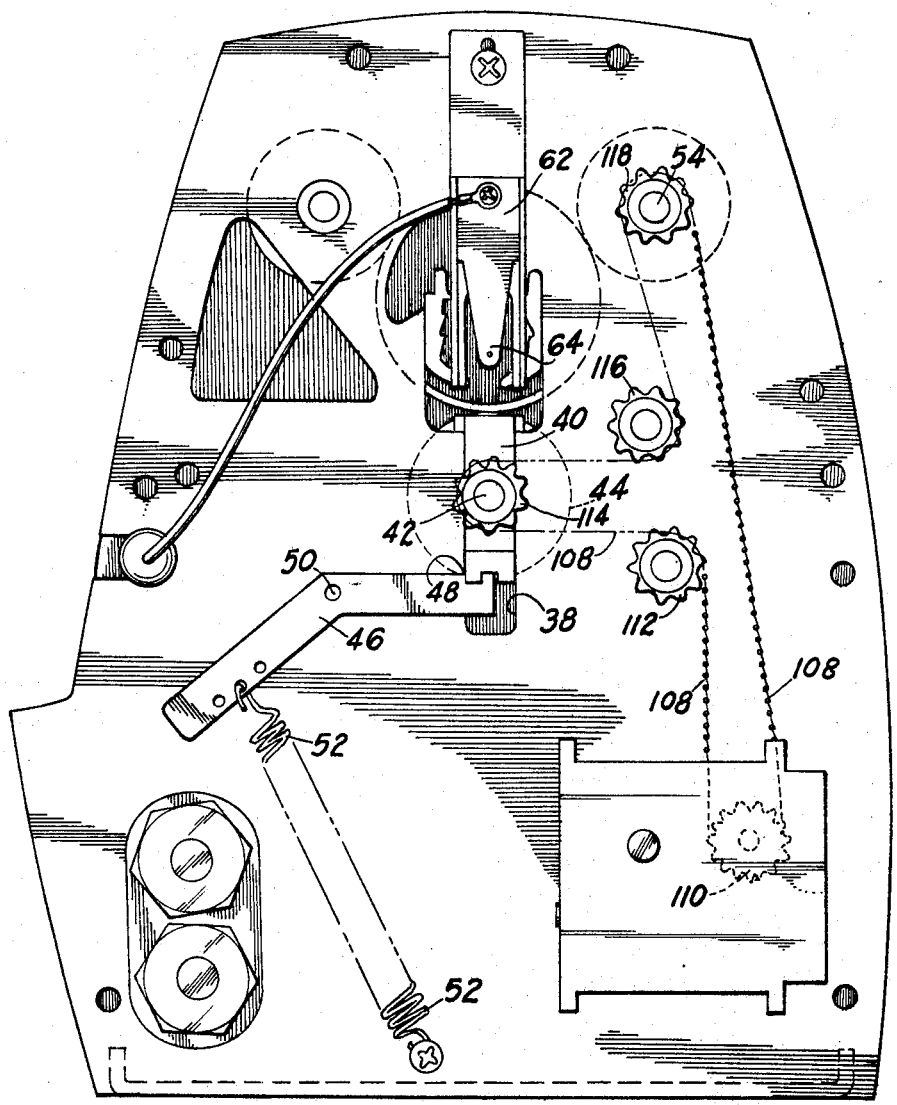
FIG. 5 is a right side elevational view of the embodiment shown in FIG. 1 with the end panel removed showing the drive linkages that are employed for operation.
Figure 6:
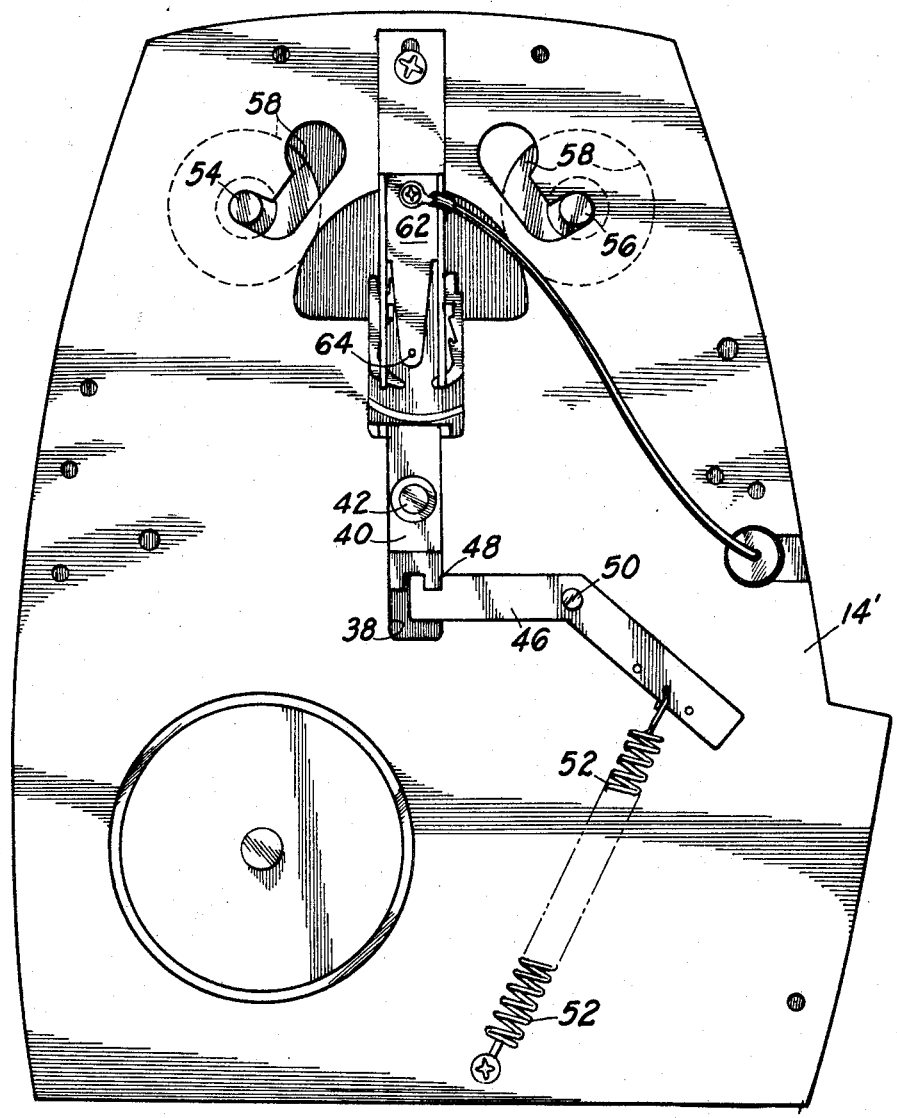
FIG. 6 is a left side elevational view of the embodiment shown in FIG. 1 with the end panel removed.
Figure 8:
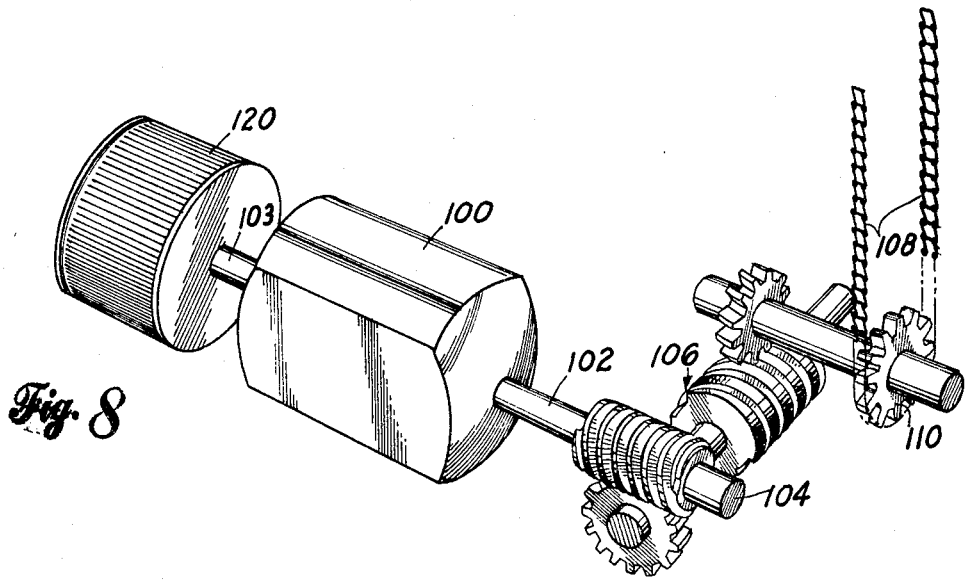
FIG. 8 is a partial perspective view showing a single drive means that is operatively connected to both the driving gears for operating the machine and the squirrel cage fan used for cooling the system.
Figure 9:
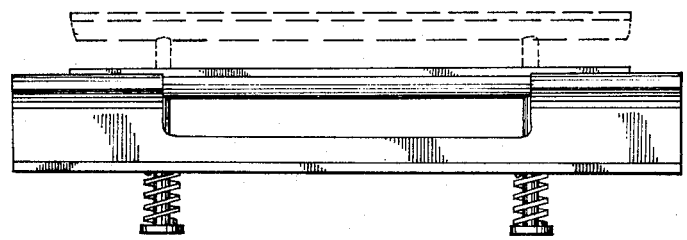
FIG. 9 is a partial elevational view of the retractable handle arrangement that is utilized in carrying.

Within the housing H there is positioned a single motor 100 that is utilized for feeding material through the machine and simultaneously cooling the interior of the housing H. The motor 100 is 115 volts, AC, $\frac{1}{15}$ HP universal type and is commercially available from Motor Specialty, Inc. of Racine, Wisconsin. In FIG. 8 it will be seen that motor 100 has a shaft 102, the outer end 104 being connected to a gear arrangement 106 for reducing the rotary speed of said motor 100. Referring to FIG. 5, a drive chain 108 is connected to the driving gear 110 of said gear box arrangement 106 and in turn intermeshes with idler sprocket 112, drive sprocket 114 that is operatively connected to the lower drive roller 44 and thence connected to idler sprocket 116 and thence to drive sprocket 118 that is operatively connected to the upper drive shaft 54. The other end 103 of the shaft 102 is connected to a turbine or squirrel cage fan 120. Referring to FIG. 2, it should be noted that on the underside of the entry copy support plate 34 there are positioned a photoresistor 130 and an exciter lamp 132. Apertures 134 and 136 are also formed in said support plate 34. A beam of light from the exciter lamp 132 is normally transmitted through aperture 136, but when a piece of material is fed into the machine and moves over the aperture 136, the beam of light is reflected down through aperture 134 onto the photoresistor 130, thereby activating the heat lamp 86. The machine is further equipped with an on and off switch 140 and a speed control 142.

Figure 3:
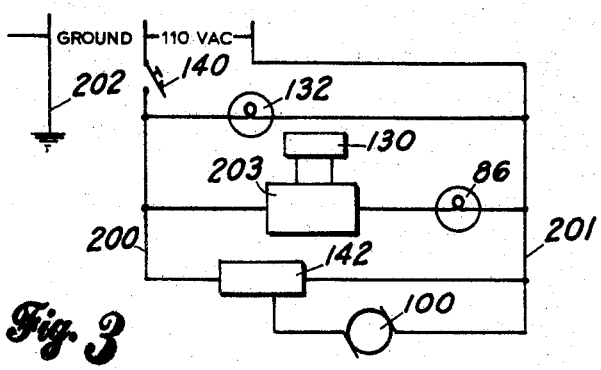
FIG. 3 is a schematic diagram of the electrical circuitry employed in the present copying machine.

Referring to FIG. 3, the control circuit of the invention is connected to a conventional 110 v. AC source through hot wire 200 and ground wires 201 and 202. The off-on switch 140 is interposed in wire 200 to selectively energize the control circuit. The exciter lamp 132 is connected between wires 200 and 201 and is illuminated when switch 140 is closed.

A lamp switch 203 and the heat lamp 86 are connected in series with wires 200 and 201 and in parallel with lamp 132. The lamp switch 203 includes a pair of conventional silicon controlled rectifiers connected to photoresistor 130 in conventional manner so that light from the exciter lamp 132 lowers the resistance of the photoresistor 130 to trigger the rectifiers of the lamp switch 203 and cause the heat lamp 86 to be illuminated.

The fixed resistance terminals of the speed control 142 are connected between wires 200 and 201 in parallel with the lamp 132 and the variable resistance terminal of the speed control 142 is connected to wire 201 through the motor 100 so that the speed thereof can be regulated.

Although various components may be used in the control circuit, the following components have been found satisfactory. The exciter lamp 132 is a conventional 10 watt, 115 v. AC bulb, the photoresistor 130 is a cadmium sulfide type having a nonlighted resistance of 100,000 ohms and a lighted resistance of 200 ohms, and the off-on switch 140 is a 15 amp, single pole, rotary type switch.

Referring to FIG. 11, the copying machine 10 is cooled by creating a flow of air that enters the machine through entry throat 28 and exit throat 30 and is channelled down air duct 150 and passes through ports 152 and 154 formed in side plate 14, thence down through the transparent roller 60 and out port 156 and then downwardly between side plate 14′ and end plate 16′ into tube 158 which communicate with fan 120 that exhausts the hot air out of exhaust port 32.

OPERATION

A specimen S to be copied is placed within a transparent carrier C and either a heat sensitive sheet is placed in contact with said specimen S or a heat sensitive carbon paper is deposed between the specimen S and the material on which the copy is to be made.

The machine is turned on by switch 140, and the desired intensity is set by adjusting the speed control 142 to one of some ten settings, it being understood that the slower the speed the darker the copy. The carrier C is then fed into the entry throat 28, whereupon the photoresistor 130 is activated by the light from exciter lamp 132 being reflected off the specimen S, which in turn activates the heat lamp 86 as the material is fed through the machine between rollers 44 and 60 being dispensed at the exit throat 30.

It will be further understood by those skilled in the art that many variations may be made in the embodiment chosen for the purpose of illustrating the present invention without departing from the scope thereof as defined by the appended claims.

We claim:

1. A portable thermographic copying machine for producing a copy of a selected specimen comprising
    a housing having an entry throat and an exit throat formed therein,
    said entry and exit throats being disposed in a substantially common plane for feeding the specimen and copy material through said machine in substantially straight linear path so as to prevent relative displacement between said specimen and copy material for attaining a clear reproduction,
    a roller transparent to infrared light positioned for rotation within said housing about a first axis,
    a second roller positioned for rotation within said housing about a second axis,
    means for effecting displacement between said first and second axes to permit the passage of specimens of varying thicknesses between said rollers,
    a reflector positioned within said transparent roller,
    said reflector including an elongated frame member having a C-shaped cross section and having an elongated heat reflecting surface of arcuate cross section disposed within the interior of said frame member so that the concave surface of the heat reflector is adjacent the open side of the frame member,
    a heat lamp disposed adjacent said reflector along an axis that substantially coincides with the focal point of said reflecting surface, and
    an electrical control circuit for selectively energizing said heat lamp,
    said control circuit including an exciter lamp positioned adjacent said entry throat to normally transmit a beam of light when energized, a photoresistor positioned adjacent said exciter lamp; the resistance of said photoresistor being lowered when light is reflected from the exciter lamp to the photoresistor by a specimen being fed into said entry throat and across said light beam, and solid state controlled rectifying means connected to said heat lamp so as to permit activation thereof in response to the lowered resistance of the photoresistor.

2. A portable thermographic copying machine as defined in claim 1 and further characterized in that said reflector includes an air void disposed between the convex surface of said reflector plate and the interior surface of said frame member so as to attain uniform distribution of heat across said reflector plate, thus achieving uniformity of reproduction along said opening.

3. A portable thermographic copying machine as defined in claim 1 and further characterized by a means for normally urging said first and second axes toward each other.

4. A portable thermographic copying machine as defined in claim 3 and further characterized by a drive means for causing relative rotation of said infrared light transmitting roller and said second roller for feeding said specimen and copy material through said machine.

5. A portable thermographic copying machine as defined in claim 4 and further characterized by a means for cooling said machine being further associated with said drive means.

6. A portable thermographic copying machine as defined in claim 5 and further characterized in that said means for cooling causes a unidirectional flow of cool air through said infrared light transmitting roller.

7. A portable thermographic copying machine as defined in claim 6 and further characterized in that the flow of air for cooling enters said housing adjacent said entry throat and is exhausted from said housing adjacent said exit throat.

8. A portable thermographic copying machine as defined in claim 7 and further characterized by a means for varying the speed of said drive means.

9. A portable thermographic copying machine as defined in claim 8 and further characterized by a means for activating and deactivating said machine.

10. In a thermographic copying machine for producing a copy of a selected specimen upon the energizing of a heat lamp, the improvement comprising an electrical control circuit for selectively energizing said heat lamp,
    said control circuit including an exciter lamp positioned adjacent the specimen entry throat of said machine to normally transmit a beam of light when energized, a photoresistor positioned adjacent said exciter lamp, the resistance of said photoresistor being lowered when light is reflected from the exciter lamp to the photoresistor by a specimen being fed into said entry throat and across said light beam, and solid state controlled recifying means connected to said heater lamp so as to permit activation thereof in response to the lowered resistance of the photoresistor.

References Cited

UNITED STATES PATENTS

| 3,157,786 | 11/1964 | Limberger | 250—65.1 |
| 3,170,395 | 2/1965 | Gundlach et al. | 250—65.1 |
| 3,214,585 | 10/1965 | Stroszynski | 250—65.1 |
| 3,360,652 | 12/1967 | Bernous | 250—219 |

RALPH G. NILSON, Primary Examiner

C. E. CHURCH, Assistant Examiner

U.S. Cl. X.R.

219—216; 250—214, 219